United States Patent
Elliott

(10) Patent No.: US 8,665,936 B2
(45) Date of Patent: Mar. 4, 2014

(54) EXPERIMENTS TRANSMITTER TRAINING SYSTEMS AND METHOD

(75) Inventor: Robert C Elliott, Houston, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 25 days.

(21) Appl. No.: 13/397,158

(22) Filed: Feb. 15, 2012

(65) Prior Publication Data

US 2013/0208817 A1 Aug. 15, 2013

(51) Int. Cl.
*H04B 3/46* (2006.01)
*H04B 17/00* (2006.01)
*H04Q 1/20* (2006.01)

(52) U.S. Cl.
USPC ........................................................ 375/224

(58) Field of Classification Search
USPC .................................................. 375/224, 232
See application file for complete search history.

(56) References Cited

U.S. PATENT DOCUMENTS

| 7,623,886 | B2 | 11/2009 | Ma et al. |
| 2010/0303187 | A1 | 12/2010 | Kobayashi et al. |
| 2010/0329325 | A1* | 12/2010 | Mobin et al. .................. 375/232 |
| 2011/0206141 | A1 | 8/2011 | Barrett et al. |

FOREIGN PATENT DOCUMENTS

| JP | 57097236 A | 6/1982 |
| JP | 2008/271107 A | 11/2008 |

* cited by examiner

*Primary Examiner* — Chieh M Fan
*Assistant Examiner* — Tanmay Shah

(57) ABSTRACT

A communication system and method are disclosed. The system includes a receiver to receive and process a transmission signal provided from a transmitter based on a digital input signal, and to generate a receiver signal that indicates eye characteristics associated with transmission characteristics of the processed transmission signal. The transmission characteristics can be set by a digital filter associated with the transmitter based on filter parameters. The system further includes a transmitter training system to implement a plurality of experiments based on implementing Design of Experiments (DOE) to provide the filter parameters to the transmitter and to evaluate the corresponding eye characteristics to determine an output set of filter parameters.

15 Claims, 5 Drawing Sheets

EXPERIMENTS TRANSMITTER TRAINING SYSTEMS AND METHOD

BACKGROUND

High-speed data communication technology continues to evolve as the demand for such communication increases. A number of serial interfaces are implemented to provide high-speed data communication, such as PCI Express, Ethernet over Electrical Backplanes, Serial-Attached Small Computer System Interface (SCSI), and Fibre Channel (FC). Such serial interfaces can include a multi-tap Finite Impulse Response (FIR) filter to shape the waveform being transmitted, such as by adjusting the overall transmitter amplitude and by performing de-emphasis near transitions. These interfaces can include training protocols, such that the receiver instructs the transmitter to adjust its settings to optimize the signal being received, as measured inside the receiver after receiver-side signal processing.

DETAILED DESCRIPTION

The systems and method described herein relate to a communication system, and more specifically, transmitter training systems and method that implement Design of Experiments (DOE). The systems and method implement the DOE to generate a proper subset of all possible combinations of sets of filter tap coefficient values that are provided to a digital filter (e.g., finite impulse response filter) to conduct experiments based on the proper subset and to evaluate results therefrom. As a result, the transmitter can be trained to achieve desired output characteristics within a predetermined transmitter training time without the impracticality of implementing experiments with all possible combinations of sets of filter tap coefficient values and without generating sets of filter tap coefficient values in a random or pseudorandom manner, thus leaving open the possibility that one or more desired sets of filter tap coefficient values in the sample space are not discovered during the training process, resulting in a less desirable bit error rate (BER).

Figure 1:
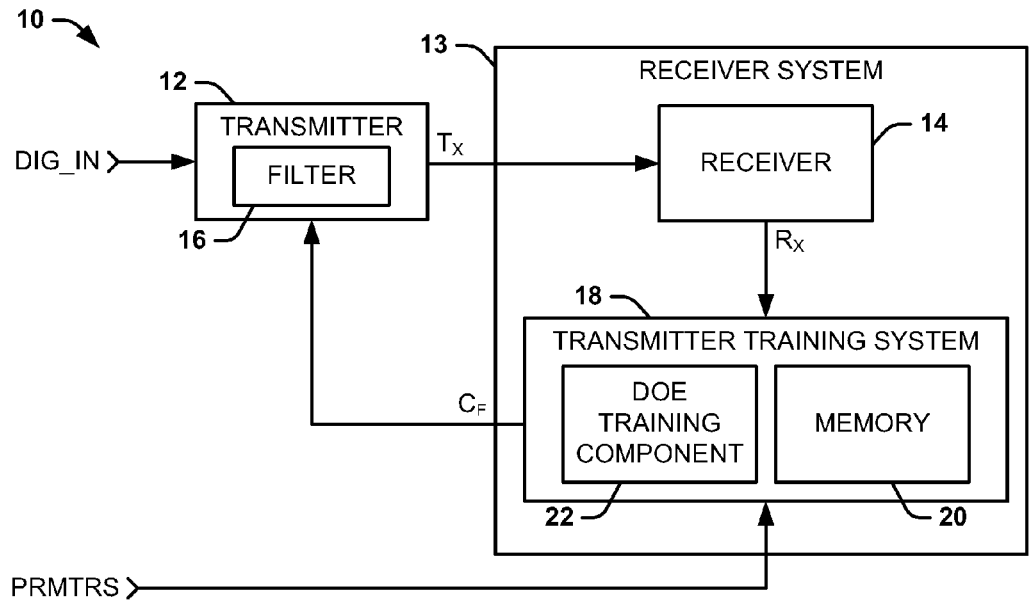
FIG. 1 illustrates an example of a communication system.

FIG. 1 illustrates an example of a communication system 10. The communication system 10 can correspond to a high-speed data link. The communication system 10 includes a transmitter 12 and a receiver system 13 that includes a receiver 14. The transmitter 12 is configured to provide an analog transmission signal $T_X$ to the receiver 14 based on a digital input signal DIG_IN. As an example, the transmitter 12 and the receiver 14 can operate based on any of a variety of communication protocols, such as PCI Express 3.0 (PCIe), 10 Gigabit Ethernet over Electrical Backplanes (10GBASE-KR), Serial Attached SCSI-3 (SAS), and Fibre Channel (FC).

In the example of FIG. 1, the transmitter 12 includes a filter 16 that can be configured as a digital filter. For example, the filter 16 can be configured as a Finite Impulse Response (FIR) filter that can include one or more programmable taps. The filter 16 can thus be configured to adjust transmission characteristics associated with the transmission signal $T_X$, such as to shape the analog waveform of the transmission signal $T_X$ (e.g., by adjusting the amplitude and by performing de-emphasis near transitions). The transmission signal $T_X$ is thus transmitted to the receiver 14 having the transmission characteristics that are set by the filter 16, such as based on a set of one or more filter tap coefficient values (i.e., filter parameters or weights) that are programmed into the respective one or more programmable taps. Therefore, subsequent to a training session, the receiver 14 can be configured to demodulate data transmitted from the transmitter 12 at a substantially improved bit-error rate (BER) according to eye characteristics (e.g., large eye height and eye width), such as corresponding to an eye diagram associated with a plurality of consecutively samples of the transmission signal $T_X$, that are dictated by the transmission characteristics set by the filter 16.

Figure 2:
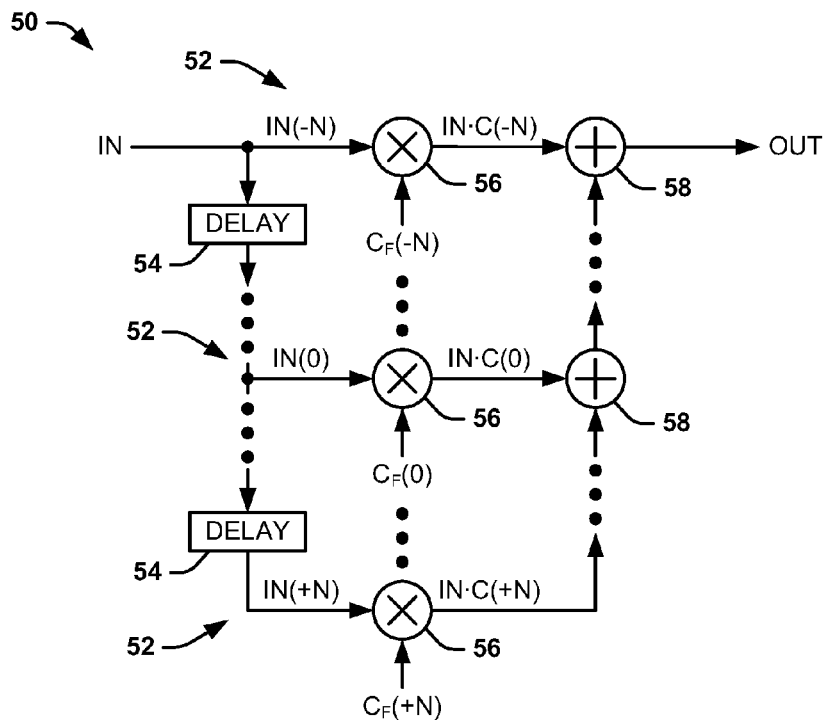
FIG. 2 illustrates an example of a filter system.

FIG. 2 illustrates an example of a filter system 50. As an example, the filter system 50 can correspond to a representation of the filter 16 in the example of FIG. 1. The filter system 50 includes a plurality of taps 52 that are separated from each other by respective delay elements 54. In the example of FIG. 2, the filter system 50 includes a center tap 52 denoted "0" and a total of "N" positive and negative taps 52. The number of taps 52 can be dictated by the communication protocol with which the transmitter 12 and the receiver 14 communicate. As an example, the number "N" of positive and negative taps 52 could be one, such as in the case of the 10GBASE-KR communication protocol, such that the filter system 50 includes three taps 52.

In the example of FIG. 2, the filter system 50 receives a digital signal IN, which could correspond to the digital signal DIG_IN in the example of FIG. 1. Each bit of the digital signal IN is thus provided to each of the taps 52 of the filter system 50, such as via one or more of the delay elements 54. Each bit of the digital signal IN is thus multiplied by a respective filter tap coefficient $C_F$, demonstrated in the example of FIG. 2 as filter tap coefficient values $C_F(-N)$ though $C_F(0)$ through $C_F(+N)$, corresponding to the respective tap 52 via a multiplier 56. In the example of three taps 52 for the 10GBASE-KR communication protocol, the center tap 52 (i.e., 0) can control overall amplitude of the transmission signal $T_X$, the pre-cursor tap 52 (i.e., −N) can adjust the amplitude of the transmission signal $T_X$ in anticipation of a next bit to be transmitted, and the post-cursor tap 52 (i.e., +N) can adjust the amplitude of the transmission signal $T_X$ based on the previous bit that was transmitted. The resultant products can be summed together at each iteration of the filter system 50 via adders 58 to provide the output signal OUT. The output signal OUT thus corresponds to the digital signal DIG_IN having desired transmission characteristics.

Referring back to the example of FIG. 1, the receiver system 13 also includes a transmitter training system 18 configured to set the transmission characteristics of the transmission signal $T_X$. As an example, upon a communication session being initiated between the transmitter 12 and the receiver 14, a training session can be conducted, such as dictated by the communication protocol with which the transmitter 12 and the receiver 14 communicate. The training session can thus be implemented to set the desired (e.g., optimal) transmission characteristics of the transmission signal $T_X$ based on feedback from the receiver 14 corresponding to the eye characteristics associated with the processing of the transmission signal $T_X$. While the transmitter training system 18 is demonstrated in the example of FIG. 1 as being part of the receiver system 13, it is to be understood that the transmitter training system 18 could be separate from the receiver system 13, such as based on the transmitter training system 18 being incorporated as a separate controller or integrated circuit (IC).

In the example of FIG. 1, the transmitter training system 18 includes a memory 20 and a Design of Experiments (DOE) training component 22. The memory 20 is configured to store a variety of information. For example, the memory 20 can be configured to store eye characteristics of the received and processed transmission signal $T_X$ via the receiver 14, demonstrated in the example of FIG. 1 as being provided via a receiver signal $R_X$. As another example, the memory 20 can be configured to store data corresponding to parameters associated with the communication protocol and the training session of the transmitter 12. As an example, the parameters PRMTRS can include a quantity of filter taps of the filter 16, a range of values of the corresponding filter tap coefficient values, a time associated with the training session, and/or a variety of other parameters. In the example of FIG. 1, the parameters are demonstrated as being provided via an input signal PRMTRS. However, it is to be understood that such parameters could be fixed values within the memory 20 or the transmitter training system 18.

The DOE training component 22 can be configured as firmware, software, or as a combination thereof. The DOE training component 22 is configured to generate a plurality of sets of filter tap coefficient values, each set corresponding to a respective one of a plurality of experiments that are conducted via the filter 16 and the transmitter 12, to determine an output set of filter tap coefficient values for the filter 16 during the training session. As an example, the DOE training component 22 can implement a DOE selection algorithm that can be software driven to select a proper subset of all possible combinations of filter tap coefficient values to conduct the corresponding experiments to within the time limitation of the training session.

For example, in the 10GBASE-KR communication protocol, three filter taps each having a value range of twenty-four separate levels can yield 13,824 possible combinations of filter tap coefficient values. To conduct an experiment that tests each of these possible combinations, with each experiment including the transmission of thousands or more bits, would take more time than the time allotted for a training session and would be impractical if the transmission included too few bits for each possible combination. Therefore, the DOE training component 22 can select a proper subset of less than all possible combinations of filter tap coefficient values, such as substantially evenly distributed in a coefficient sample space defined by all possible combinations of filter tap coefficient values. Therefore, the number of experiments conducted by the DOE training component 22 can be significantly reduced. The DOE training component 22 can thus determine the output set of filter tap coefficient values based on the results of the experiments, as indicated by the eye characteristics of the processed transmission signal $T_X$ via the receiver signal $R_X$ provided by the receiver 14. Accordingly, the transmitter training system 18 can rapidly and effectively train the transmitter 12 for an efficient data transmission.

Figure 3:
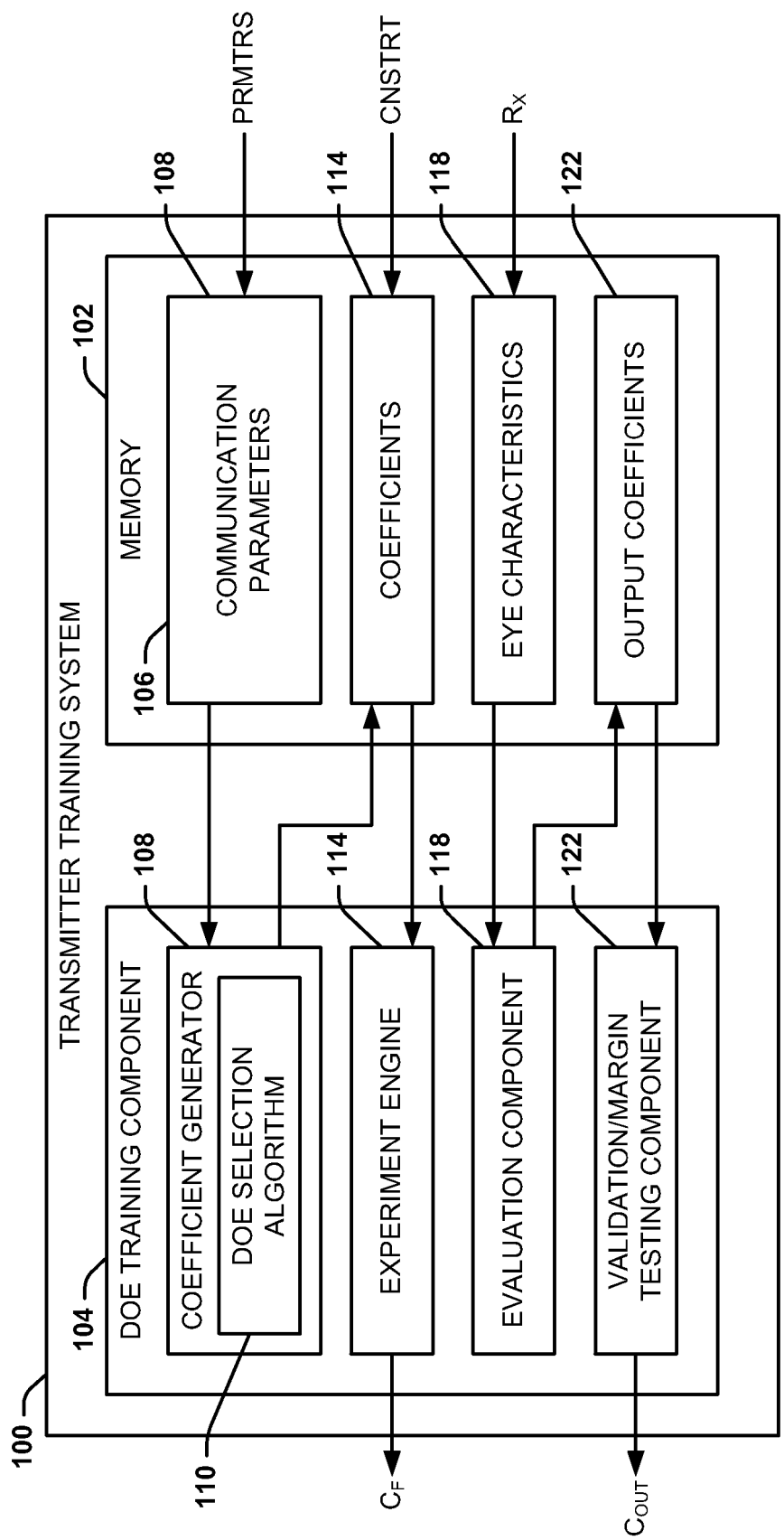
FIG. 3 illustrates an example of a transmitter training system.

FIG. 3 illustrates an example of a transmitter training system 100. The transmitter training system 100 can correspond to the transmitter training system 18 in the example of FIG. 1. Therefore, reference is to be made to the example of FIG. 1 in the following description of the example of FIG. 3.

The transmitter training system 100 includes a memory 102 and a DOE training component 104. In the example of FIG. 3, the memory 102 is demonstrated as receiving a signal PRMTRS, which can correspond to data pertaining to parameters associated with the communication protocol and the training session of the transmitter 12, such as a quantity of filter taps of the filter 16, a range of values of the corresponding filter tap coefficient values, and a time associated with the training session. The data associated with the signal PRMTRS is stored in the memory 102 as communication parameters 106.

The DOE training component 104 is demonstrated in the example of FIG. 3 as including a coefficient generator 108. The coefficient generator 108 is configured to generate a plurality of sets of filter tap coefficient values (i.e., filter parameters) based on the communication parameters 106. For example, the coefficient generator 108 can be configured to implement a DOE selection algorithm 110 that is configured to determine a plurality of sets of filter tap coefficient values that is less than all possible combinations of filter tap coefficient values in a given sample space that is defined by the communication parameters 106. As an example, the sample space can be defined as an array having dimensions corresponding to the number of taps 52 of the filter 16 along with all possible values for each of the filter tap coefficient values of the filter 16. The DOE selection algorithm 110 can be implemented as any of a variety of DOE software implementations, such as JMP by SAS Institute Inc. For example, the DOE selection algorithm 110 can generate the plurality of sets of filter tap coefficient values as being substantially evenly distributed within the sample space.

As an example, the coefficient generator 108 could be configured to generate the sets of filter tap coefficient values based on a predetermined training time, such as dictated by the communication protocol. For example, the coefficient generator 108 can divide the predetermined training time by a known amount of time to conduct an experiment for a given set of filter tap coefficient values. The division of the predetermined training time can also include a predetermined amount of error to account for delays, validation, and/or margin testing, such as described in greater detail herein. As another example, the coefficient generator 108 can be programmable with respect to the number of sets of filter tap coefficient values, such that the time provided for each experiment can be set based on the number of sets of filter tap coefficient values provided as an input.

Figure 4:
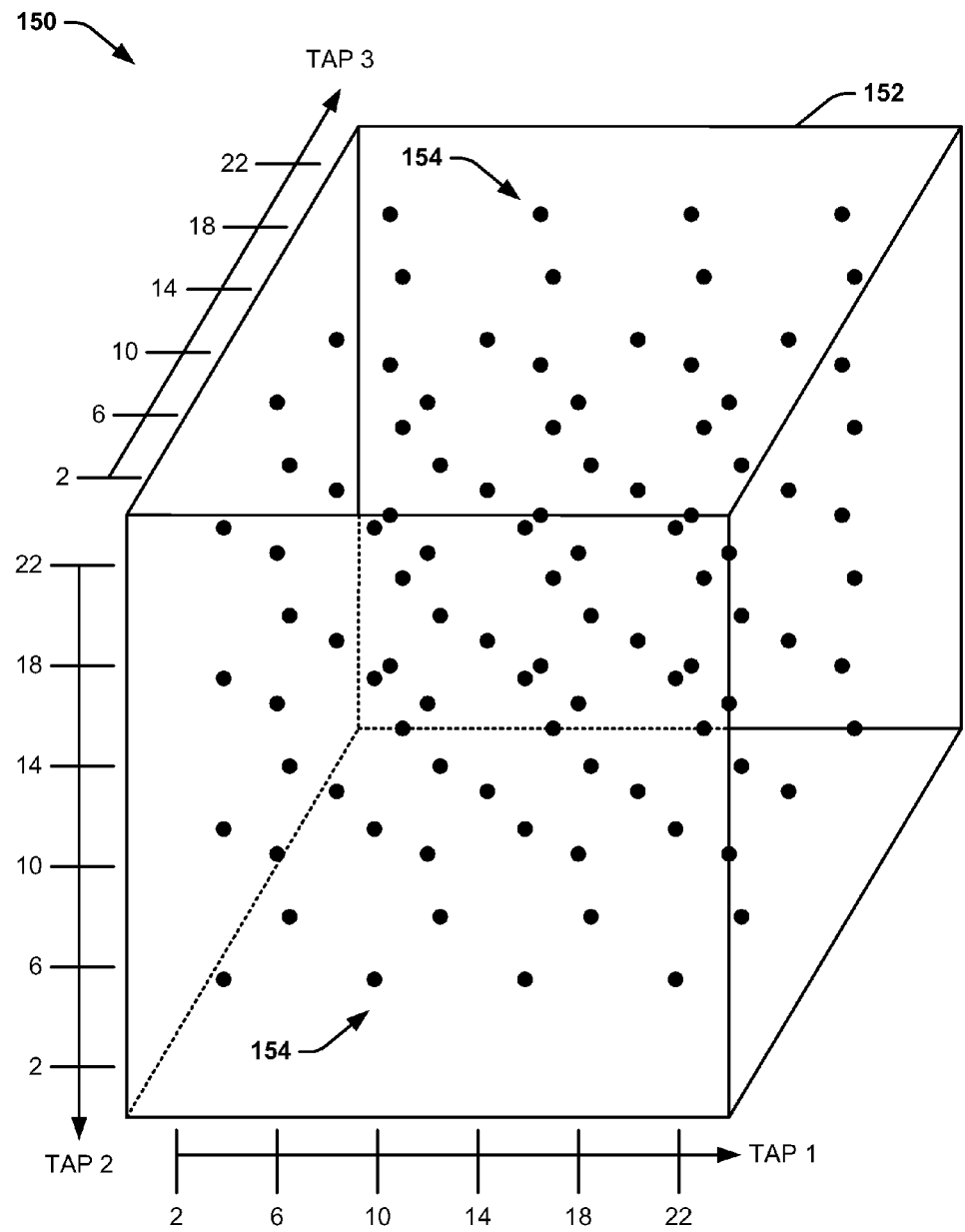
FIG. 4 illustrates an example diagram of a coefficient sample space.

FIG. 4 illustrates an example diagram 150 of a coefficient sample space 152. In the example of FIG. 4, the diagram 150 represents a plurality of sets of filter tap coefficient values 154 for a filter 16 having three taps. The first tap is demonstrated as TAP 1, the second tap is demonstrated as TAP 2, and the third tap is demonstrated as TAP 3. In the example of FIG. 4, each of the three taps has a range of twenty-four filter tap coefficient values, and therefore has a total of 13,824 (i.e., $24^3$) possible combinations of filter tap coefficient sets. As described previously herein, to conduct an experiment that tests each of these possible combinations, with each experiment including the transmission of thousands or more bits, would take more time than the time allotted for a training session and would be impractical if the transmission included too few bits for each possible combination. Therefore, the diagram 150 demonstrates ninety-six sets of filter tap coefficient values 154, such as the filter tap coefficient values that can be selected by the DOE selection algorithm 110. As demonstrated in the example of FIG. 4, the ninety-six sets of filter tap coefficient values 154 can be substantially evenly distributed within the coefficient sample space 152. Therefore, as described in greater detail herein, each of the sets of filter tap coefficient values 154 can correspond to separate experiments to determine an output set of filter tap coefficient values for training of the transmitter 12.

Referring back to the example of FIG. 3, the sets of filter tap coefficient values that are generated by the coefficient generator 108 are stored in the memory 102, demonstrated in the example of FIG. 3 as coefficient values 112. In the example of FIG. 3, the memory 102 is demonstrated as receiving a signal CNSTRT corresponding to user-input constraints on the sets of coefficient values 112. As an example, the constraints could correspond to locations in the coefficient sample space 152 that are a-priori known to not include the output set of coefficient values. The signal CNSTRT could thus provide an input to the memory 102 to delete the sets of coefficient values 112 that are within the known exclusionary locations within the coefficient sample space 152. As another example, the signal CNSTRT could be provided to the coefficient generator 108, such that the coefficient generator 108 generates the sets of coefficient values in all locations of the coefficient sample space 152 except the region defined by the signal CNSTRT. The coefficient generator 108 could thus generate less sets of coefficient values 112 based on the constraints defined by the signal CNSTRT, or could generate the same number of sets of coefficient values 112, thus redistributing the sets of coefficient values 112 into acceptable locations within the coefficient sample space 152.

Figure 5:
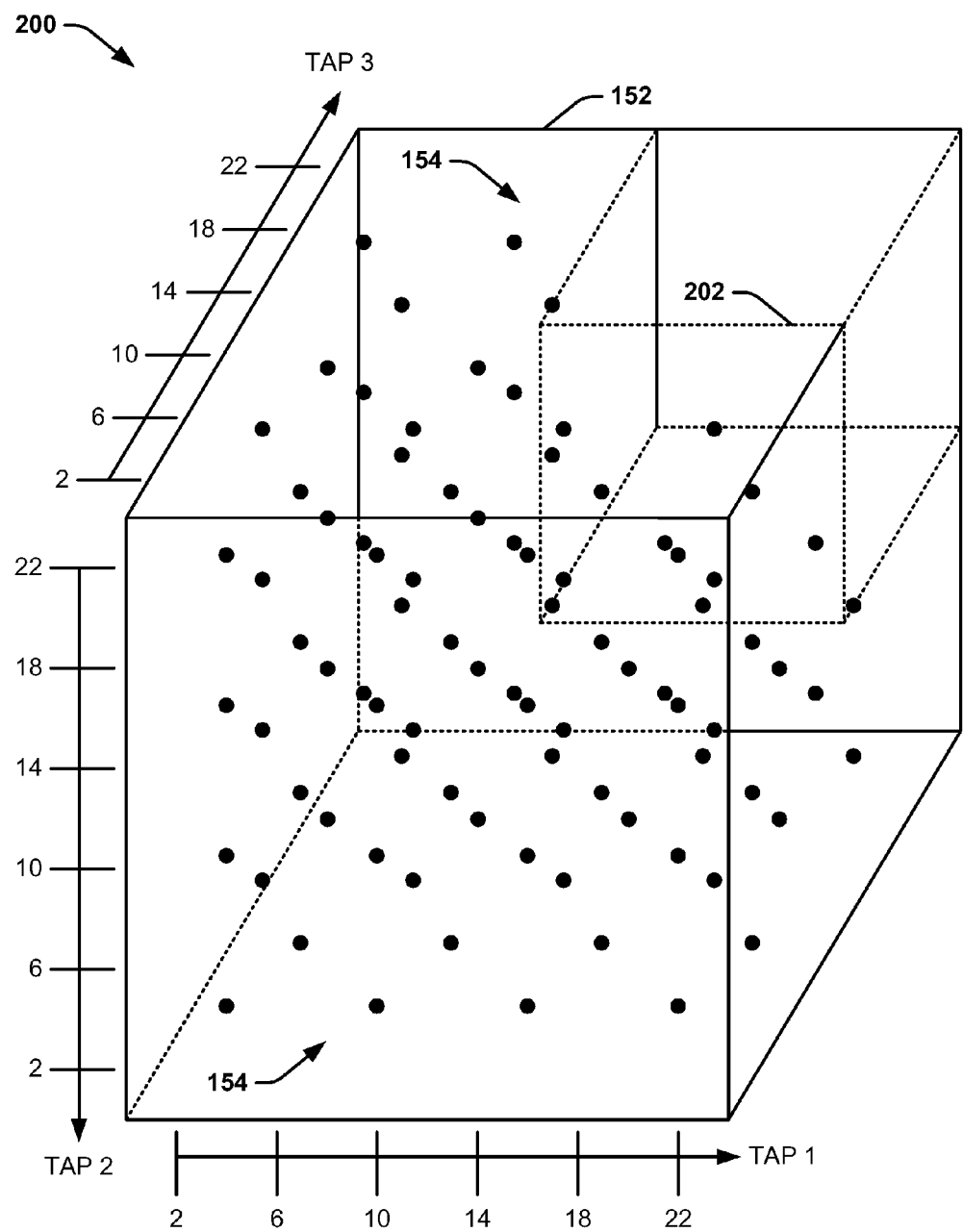
FIG. 5 illustrates another example diagram of a coefficient sample space.

FIG. 5 illustrates an example diagram 200 of the coefficient sample space 152. In the example of FIG. 5, the diagram 200 represents the plurality of sets of filter tap coefficient values 154 for the filter 16 having three taps. The diagram 200 also includes a constraint region 202 in the coefficient sample space 152. As an example, the constraint region 202 can be programmed, such as based on the signal CNSTRT, to exclude the sets of filter tap coefficient values in the coefficient sample space 152 that are within the constraint region 202. As a result, the diagram 150 demonstrates eighty-four sets of filter tap coefficient values 154. As demonstrated in the example of FIG. 5, the eighty-four sets of filter tap coefficient values 154 are substantially evenly distributed within the remaining portion of the coefficient sample space 152 that is not included in the constraint space 202.

Referring back to the example of FIG. 3, the sets of coefficient values 112 are provided to an experiment engine 114 in the DOE training component 104. The experiment engine 114 thus provides a given set of coefficient values $C_F$ to the filter 16, such that the filter taps 52 of the filter 16 are programmed with the coefficient values $C_F$. The transmitter 12 thus transmits the transmission signal $T_X$ with the transmission parameters defined by the given set of coefficient values $C_F$ programmed within the filter 16. The transmission signal $T_X$ can thus correspond to a bit stream (e.g., a predetermined sequence of bits) corresponding to the experiment for the given set of coefficient values $C_F$ with which the filter 16 is programmed. The receiver 14 thus receives and processes the transmission signal $T_X$ and provides the receiver signal $R_X$ to indicate the eye characteristics (e.g., eye height and/or eye width) of the processed transmission signal $T_X$.

In the example of FIG. 3, the eye characteristics are stored in the memory 102, demonstrated as eye characteristic data 116, in response to receiving the receiver signal $R_X$. The DOE training component 104 includes an evaluation component 118 that is configured to evaluate the eye characteristic data 116 to determine the output set of filter tap coefficient values. As an example, the evaluation component 118 can be configured to implement one or more statistical algorithms, such as a Least Means Squared (LMS) algorithm, on the eye characteristic data 116 to determine the output set of filter tap coefficient values. The evaluation component 118 can be configured to implement the algorithm on the eye characteristic data 116 in the analog and/or digital domains. The one or more statistical algorithms can be implemented to determine the output set of filter tap coefficient values as a set of filter tap coefficient values that were not generated by the coefficient generator 108, and thus not implemented in the experiments conducted by experiment engine 114. The output set of filter tap coefficient values are stored in the memory 102, demonstrated as output coefficients 120.

The DOE training component 104 further includes a validation/margin testing component 122 that is configured to validate the output set of filter tap coefficient values 120. For example, the validation/margin testing component 122 can be configured to conduct an experiment on the output set of filter tap coefficient values 120 by providing the output set of filter tap coefficient values 120, demonstrated via a signal $C_{OUT}$, to the transmitter 12 for programming the filter 16. The receiver 14 can thus indicate the eye characteristics of the processed transmission signal $T_X$ via the receiver signal $R_X$, similar to as described previously regarding the experiment engine 114. The validation/margin testing component 122 can thus confirm that the output set of filter tap coefficient values 120 provide desired (e.g., optimal) eye characteristics. As an example, if the validation/margin testing component 122 determines that the validation has failed, such as based on the eye characteristics being less than optimal (e.g., relative to the experiments of the generated sets of coefficient values 112), the validation/margin testing component 122 can either command the transmitter 12 to decrease transmission speed or can select one of the sets of filter tap coefficient values 112 that provided the best eye characteristics and provide the set to the filter 16. Accordingly, the transmitter 12 can thus be trained and operated subsequent to the validation by the validation/margin testing component 122.

In addition to the validation, the validation/margin testing component 122 can also be configured to conduct margin testing on the output set of filter tap coefficient values 120. As an example, the validation/margin testing component 122 can individually adjust each coefficient value of the output set of filter tap coefficient values 120 by a next consecutive value (e.g., adjusting in both directions, such as by +1 and by −1) at a given time and conduct an experiment on the adjusted output set of filter tap coefficient values 120. Thus number of margin adjustments and corresponding experiments can be determined, for example, by the DOE selection algorithm 110 to select a number of experiments that is less than all possible combinations of margin adjustments to the output set of filter tap coefficient values 120. Therefore, the experiments performed by the validation/margin testing component 122 during margin testing can rapidly provide further validation of the output set of filter tap coefficient values to substantially reduce the BER of the transmitter 12.

Figure 6:
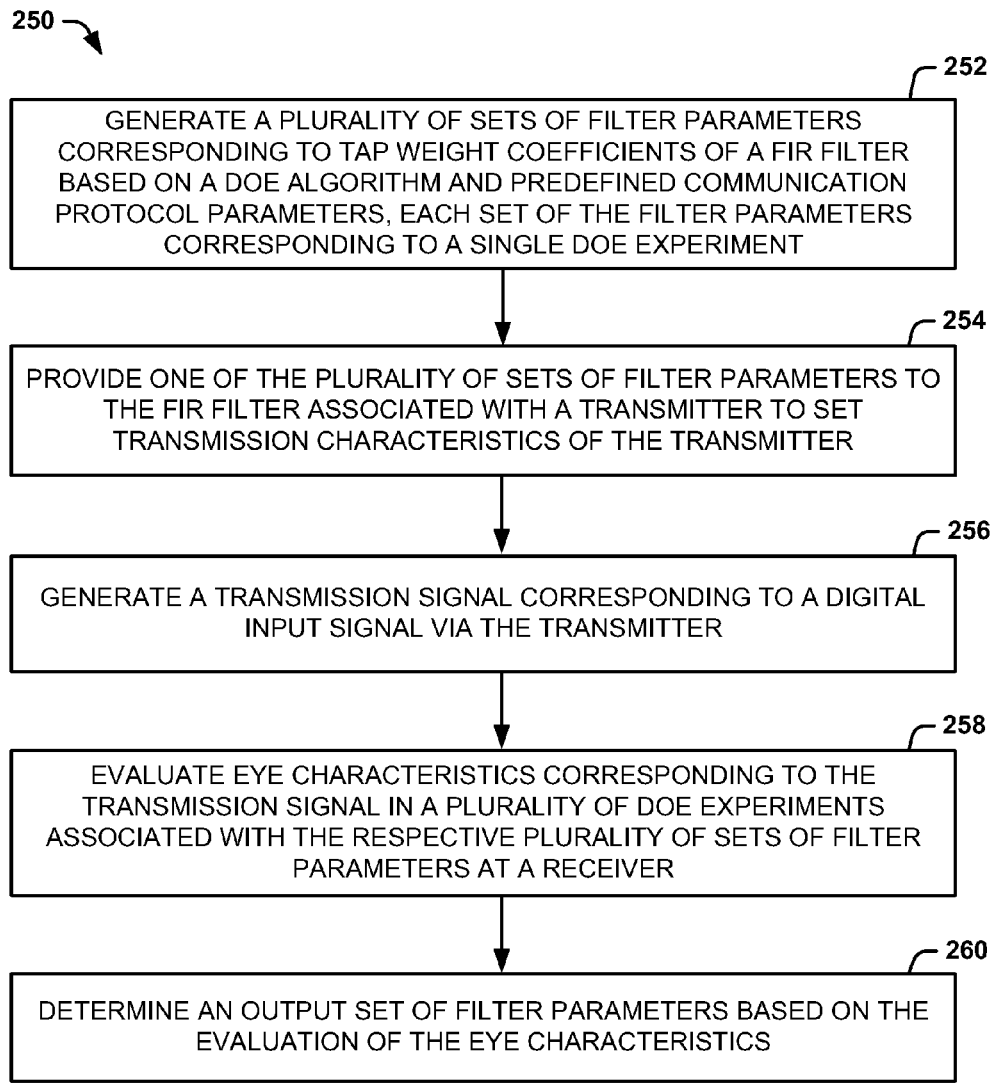
FIG. 6 illustrates an example method for training a transmitter of a communication system.

In view of the foregoing structural and functional features described above, an example method will be better appreciated with reference to FIG. 6. While, for purposes of simplicity of explanation, the method of FIG. 6 is shown and described as executing serially, it is to be understood and appreciated that the method is not limited by the illustrated order, as parts of the method could occur in different orders and/or concurrently from that shown and described herein.

FIG. 6 illustrates an example of a method 250 for training a transmitter of a communication system. At 252, a plurality of sets of filter parameters corresponding to tap weight coefficients of a FIR filter (e.g., the filter 16) are generated (e.g., by the transmitter training system) based on a DOE algorithm and predefined communication protocol parameters, each set of the filter parameters corresponding to a single DOE experiment. At 254, one of the plurality of sets of filter parameters is provided to the FIR filter associated with a transmitter (e.g., the transmitter 12) to set transmission characteristics of the transmitter. At 256, a transmission signal corresponding to a digital input signal is generated via the transmitter. At 258, eye characteristics corresponding to the transmission signal in a plurality of DOE experiments associated with the respective plurality of sets of filter parameters are evaluated at a receiver (e.g., the receiver 14). At 260, an output set of filter parameters is determined based on the evaluation of the eye characteristics.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A receiver system comprising:
a receiver to receive and process a transmission signal provided from a transmitter based on a digital input signal, and to generate a receiver signal that indicates eye characteristics associated with transmission characteristics of the processed transmission signal, the transmission characteristics being set by a digital filter associated with the transmitter based on filter parameters; and
a transmitter training system to implement a plurality of experiments based on implementing Design of Experiments (DOE) to provide the filter parameters to the transmitter and to evaluate the corresponding eye characteristics to determine an output set of filter parameters, the transmitter training system further to implement a plurality of margin experiments on the output set of filter parameters based on adjusting one of the filter parameters associated with the output set of filter parameters by a corresponding test and performing an associated experiment, the plurality of margin experiments being reduced to less than all possible combinations of adjustments for each of the filter parameters based on implementing the DOE.

2. The system of claim 1, wherein the digital filter is arranged as a finite impulse response (FIR) filter, and wherein the filter parameters are arranged as a plurality of tap weight coefficients associated with the FIR filter.

3. The system of claim 1, wherein the transmitter training system is to generate a plurality of sets of the filter parameters based on predefined communication protocol parameters, each of the plurality of sets corresponding to a respective one of the plurality of experiments.

4. The system of claim 3, wherein the set of the filter parameters corresponds to a proper subset of all possible filter parameters defined by a communication protocol associated with the transmitter and the receiver based on a DOE selection algorithm and a predefined training time associated with the predefined communication protocol parameters, the proper subset corresponding to those filter parameters that are substantially evenly distributed in a parameter space defined by parameters associated with the communication protocol.

5. The system of claim 4, wherein the transmitter training system is programmable to define the parameter space in a manner corresponding to less than all possible of the filter parameters.

6. The system of claim 1, wherein the transmitter training system is to implement an evaluation algorithm to determine the output set of filter parameters based on the eye characteristics corresponding to at least one of eye height and eye width associated with the receiver signal.

7. The system of claim 1, wherein the transmitter training system is further to validate the output set of filter parameters and, in response to failure of the validation, to one of decrease a transmission speed of the transmitter and select corresponding filter parameters associated with a given one of the experiments based on the corresponding eye characteristics.

8. A method for training a transmitter of a communication system, the method comprising:
generating a plurality of sets of filter parameters corresponding to tap weight coefficients of a finite impulse response (FIR) filter based on a Design of Experiments (DOE) selection algorithm and predefined communication protocol parameters, each set of the filter parameters corresponding to a single DOE experiment;
providing one of the plurality of sets of filter parameters to the FIR filter associated with the transmitter to set transmission characteristics of the transmitter;
generating a transmission signal corresponding to a digital input signal via the transmitter;
evaluating eye characteristics corresponding to the transmission signal in a plurality of DOE experiments associated with the respective plurality of sets of filter parameters at a receiver;
determining an output set of filter parameters based on the evaluation of the eye characteristics; and
implementing a plurality of margin experiments on the output set of filter parameters, the plurality of margin experiments numbering less than all possible combinations of single consecutive value adjustments of each of the filter parameters.

9. The method of claim 8, further comprising:
validating the output set of filter parameters in the DOE experiments; and
in response to failure of the validation, one of decreasing a transmission speed of the transmitter and selecting one of the plurality of sets of filter parameters associated with a respective one of the DOE experiments based on the evaluation of the eye characteristics.

10. The method of claim 8, wherein implementing a given one of the plurality of margin experiments comprises:
adjusting a single filter parameter associated with the output set of filter parameters by a single consecutive value; and
performing an associated DOE experiment using the adjusted single filter parameter and remaining filter parameters of the output set of filter parameters.

11. The method of claim 8, further comprising defining a parameter space having less than all possible combinations of filter parameters defined by the predefined communication protocol parameters associated with the transmitter and the receiver based on the DOE selection algorithm, and wherein generating the plurality of sets of filter parameters comprises generating the plurality of sets of filter parameters as a proper subset of all possible combinations of filter parameters in the parameter space based on a predefined training time associated with the predefined communication protocol parameters.

12. A communication system comprising:

a transmitter to generate a transmission signal based on a digital input signal, the transmitter comprising a finite impulse response (FIR) filter to process the digital input signal to set transmission characteristics of the transmission signal based on filter parameters arranged as a plurality of tap weight coefficients associated with the FIR filter;

a receiver to receive the transmission signal and to generate a receiver signal corresponding to eye characteristics corresponding to the transmission characteristics of the transmission signal as received by the receiver; and a transmitter training system to generate a plurality of sets of the filter parameters based on a Design of Experiments (DOE) selection algorithm and predefined communication protocol parameters, each of the plurality of sets corresponding to a respective one of a plurality of DOE experiments, and to implement the plurality of DOE experiments to determine an output set of filter parameters based on evaluating the corresponding eye characteristics associated with the plurality of DOE experiments and to validate the output set of filter parameters and, in response to failure of the validation, to decrease a transmission speed of the transmitter based on the corresponding eye characteristics.

13. The system of claim 12, wherein the output set of filter parameters corresponds to a proper subset of all possible filter parameters corresponding to the communication protocol associated with the transmitter and the receiver based on a DOE selection algorithm and a predefined training time associated with the predefined communication protocol parameters, the proper subset corresponding to filter parameters that are substantially evenly distributed in a parameter space defined by the predefined communication protocol parameters.

14. The system of claim 12, wherein the transmitter training system is further to implement a plurality of margin experiments on the output set of filter parameters based on individually adjusting each the filter parameters associated with the output set of filter parameters by a test margin value and performing an associated experiment, the plurality of margin experiments being reduced to less than all possible combinations of corresponding adjustments for each of the filter parameters based on implementing the DOE.

15. The system of claim 12, wherein the transmitter training system, in response to the failure of the validation, is to select a given one of the sets of filter parameters associated with a given one of the DOE experiments based on the corresponding eye characteristics.

* * * * *

UNITED STATES PATENT AND TRADEMARK OFFICE
CERTIFICATE OF CORRECTION

| | | |
|---|---|---|
| PATENT NO. | : 8,665,936 B2 | Page 1 of 1 |
| APPLICATION NO. | : 13/397158 | |
| DATED | : March 4, 2014 | |
| INVENTOR(S) | : Robert C Elliott | |

It is certified that error appears in the above-identified patent and that said Letters Patent is hereby corrected as shown below:

In the Claims

In column 10, line 14, in Claim 14, after "each" insert -- of --.

Signed and Sealed this
Twenty-fourth Day of June, 2014

Michelle K. Lee
*Deputy Director of the United States Patent and Trademark Office*